C. CANUTSON.
BEET BLOCKER.
APPLICATION FILED AUG. 6, 1908.
912,987.
Patented Feb. 23, 1909.
3 SHEETS—SHEET 3.
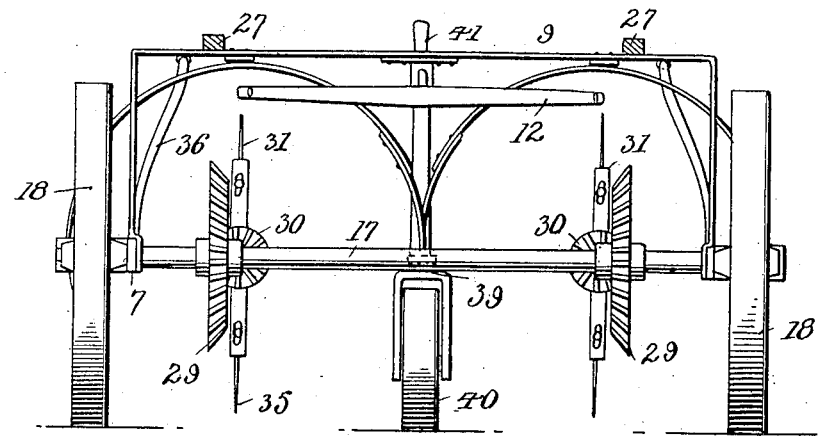
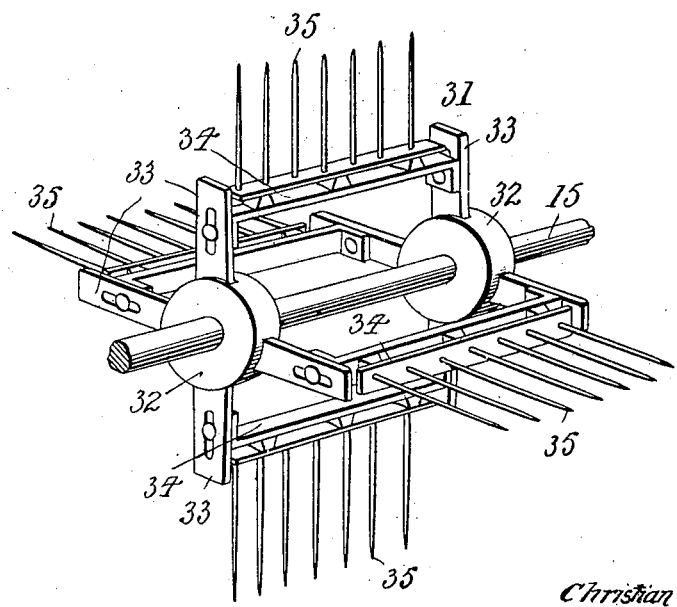
Witnesses
Inventor
Christian Canutson
By
Attorneys

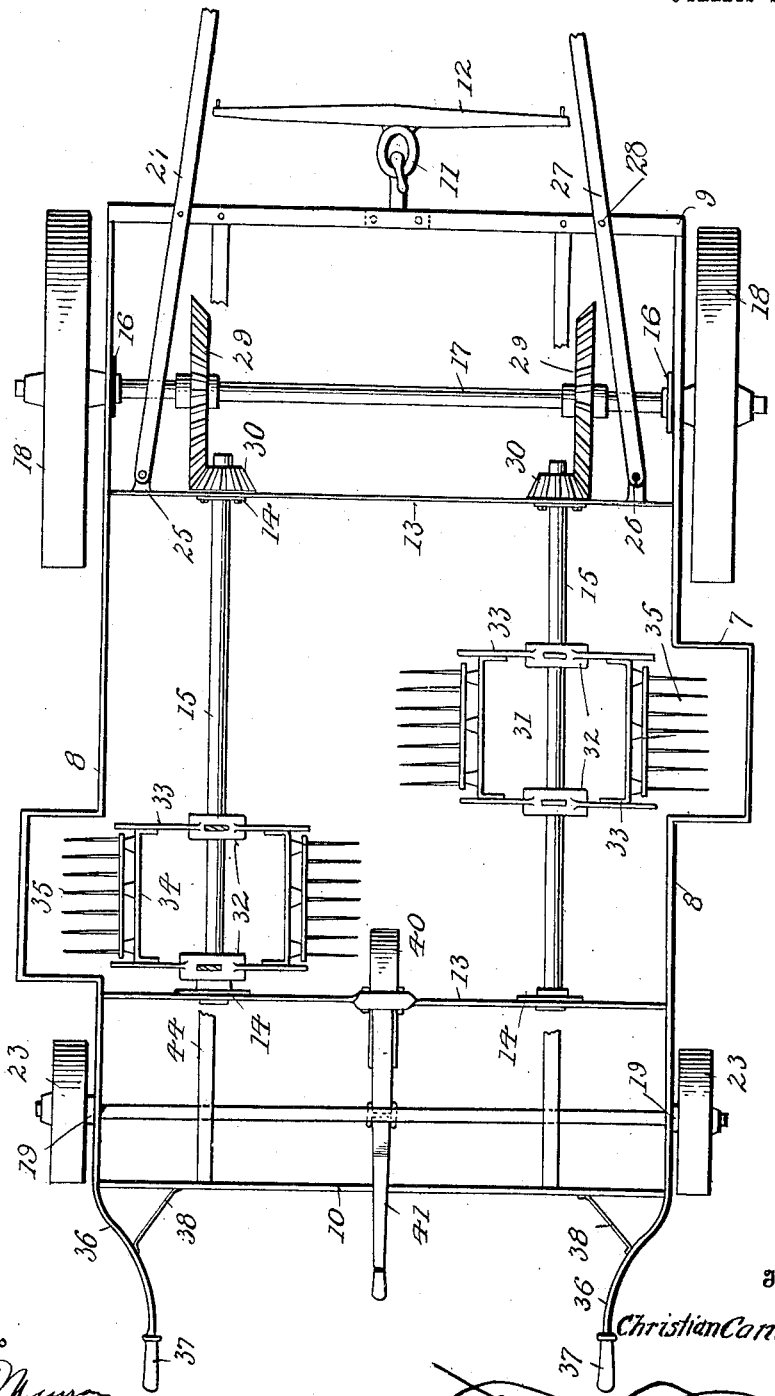

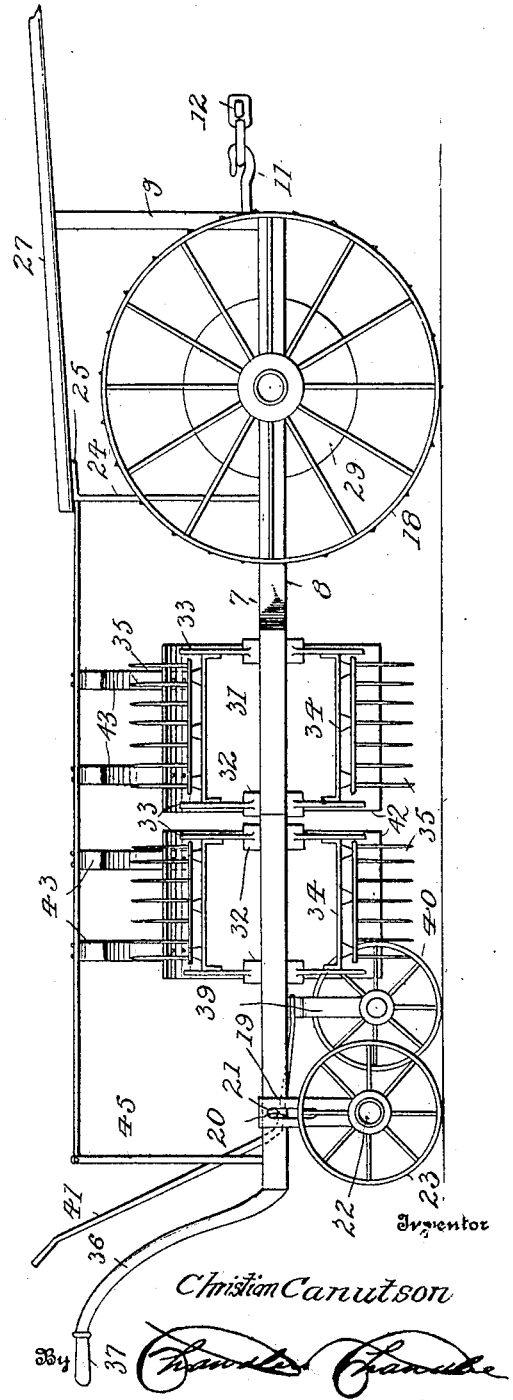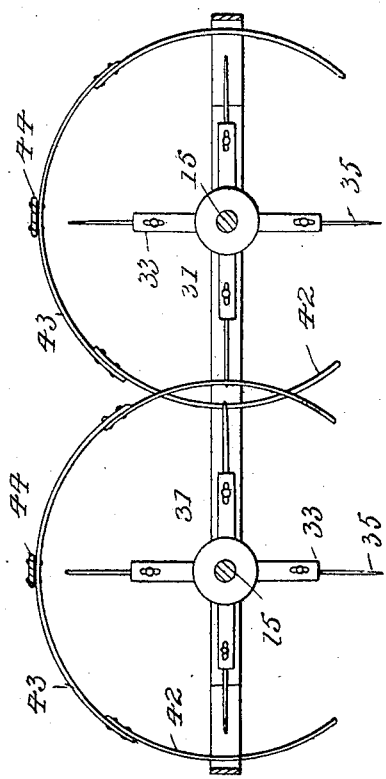

UNITED STATES PATENT OFFICE.

CHRISTIAN CANUTSON, OF ELSINORE, UTAH.

BEET-BLOCKER.

No. 912,987.    Specification of Letters Patent.    Patented Feb. 23, 1909.

Application filed August 6, 1908. Serial No. 447,252.

*To all whom it may concern:*

Be it known that I, CHRISTIAN CANUTSON, a citizen of the United States, residing at Elsinore, in the county of Sevier, State of Utah, have invented certain new and useful Improvements in Beet-Blockers; and I do hereby declare the following to be a full, clear, and exact description of the invention, such as will enable others skilled in the art to which it appertains to make and use the same.

The invention relates to a beet blocker and more particularly to the class of machines for blocking out and thinning a beet crop and also to loosen the ground adjacent the plants.

The primary object of the invention is the provision of a machine for blocking out a beet crop and which comprises a main frame having a wheeled front axle, shafts longitudinally disposed and spaced from each other in the frame and actuated by the wheeled axle and adapted to rotate in opposite directions and grubbers mounted upon said shaft, one in advance of the other which latter are adapted to block out or thin the beet crop and also to cultivate the earth adjacent the beet plant.

Another object of the invention is the provision of a machine for blocking out beet crops comprising a main frame having front and rear wheels, a driving axle or shaft rotated by the front wheels, grubbers mounted in the main frame and actuated by the driving axle or shaft to cause the same to rotate in opposite directions whereby the beet crop is blocked out and the earth cultivated adjacent the plant, and dirt arresters or fenders mounted upon the frame adjacent the grubbers.

With these and other objects in view the invention for example consists in the construction, combination and arrangement of parts as will be hereinafter more fully described and as illustrated in the accompanying drawings which disclose the preferred form of embodiment of the invention. However, it is to be understood that changes, variations and modifications can be resorted to such as come properly within the scope of the claims hereunto appended without departing from the spirit of the invention.

In the drawings: Figure 1 is a top plan view of the invention with the fenders removed. Fig. 2 is a side view thereof with fenders at one side of the grubbers and the others being broken away. Fig. 3 is a rear end view. Fig. 4 is a transverse sectional view through the frame of the machine. Fig. 5 is a detail perspective view of one grubber.

Similar reference characters indicate corresponding parts throughout the several views in the drawings.

In the drawings, the numeral 7 designates generally the main frame of the machine and which comprises spaced side bars or beams 8 united at their front extremities to a vertically disposed inverted U-shaped bar 9 and their rear extremities united to a transverse connecting bar 10 to form a unitary open frame structure. Connected centrally to the inverted U-shaped bar 9 is a coupling 11 carrying a swingletree 12 for connection with the draft animal.

To the side bars or beams 8 are united transverse beams 13 having bearings 14 in which are journaled rotatably driven shafts 15 longitudinally disposed in the main frame and adjacent opposite sides thereof.

At the front end of the main frame and journaled in bearings 16 secured to the side bars 8 is a rotatable driving axle 17 having fixed to opposite ends thereof front wheels 18.

At the rear end of the main frame 7 are vertically disposed brackets 19 having elongated slots 20 at their upper end through which pass adjustable fasteners 21 whereby the said brackets are adjustably connected to the side bars or beams 8 of the main frame so as to raise and lower said rear end of the frame with respect to the ground. On the lower ends of the brackets 19 are stud axles 22 carrying rotatable rear wheels 23 of considerably less diameter than said front wheels of the machine.

Mounted upon the forward transverse beam 13 are uprights 24 having their upper ends bent at right angles to form forwardly projecting extensions 25 with which are connected by bolt fasteners 26 the rear ends of shafts 27 which latter are superimposed upon the inverted U-shaped bar 9 and secured thereto by fasteners 28 whereby the said shafts are rigidly connected to the main frame of the machine.

Keyed to the driving axle 17 are beveled gears 29 the latter being in mesh with beveled pinions 30 fixed to the forward ends of the rotatable driven shafts 15 which latter rotate in opposite directions with respect to each other and receive their rotary movement from the front driving axle of the machine through the medium of the intermeshing gears and pinions carried by the shafts and axle respectively.

Secured upon each of the driven shafts 15 and disposed diagonally with respect to each other are grubbers 31 each of which comprises spaced hubs 32 having radially extending arms 33 united in pairs by cross pieces or plates 34 which latter are adjustably connected to the arms near their outer ends. Upon the plates 34 are mounted a plurality of spaced teeth 35 arranged in alinement with one another and projecting outwardly from the said plates, and which are adapted to loosen or break the earth during the travel of the machine.

Connected to the rear end of the frame are upwardly and rearwardly extending handle bars 36 having at their free ends handle grips 37 with which the operator guides and controls the machine. Connected to the handle bars 36 and the cross connecting bar 10 are braces 38 whereby the said handle bars are held rigid to the main frame of the machine.

Centrally of the rearmost transverse beam 13 and adjustably mounted thereon is a shank or leg 39 carrying a ground wheel 40 which latter is controlled by a throw lever or raising and lowering lever 41 whereby the rear end of the frame 7 may be raised to bring the grubbers 31 a distance away from the ground to hold the same in an inoperative position and when in such position the rear wheels 23 are elevated and held out of contact with the ground.

On opposite sides of the main frame 7 adjacent and outside of the grubbers 31 are dirt arresters or fenders 42 which latter are secured by rigid brackets or arms 43 to horizontal bars 44 superposed upon the main frame and having their rear ends connected to uprights 45 secured to the end beam or bar of said frame and their front ends secured to the inverted U-shaped bar 9 of the main frame.

It is obvious that during the travel of the machine the grubbers 31 will rotate in opposite directions with respect to each other and transversely to the line of draft of the said machine.

What is claimed is—

1. A machine of the class described comprising a main frame, a wheeled driving axle supported by the main frame, driven shafts supported in the main frame, gear connections between the driven shafts and driving axle to rotate the said shafts in opposite directions with respect to each other, toothed grubbers fixed to the driven shafts and arranged diagonally with respect to each other, supporting means superposed upon said main frame, and fenders depending from said supporting means and arranged on opposite sides of each grubber.

2. A machine of the class described comprising a main frame, a wheeled driving axle supported by the main frame, driven shafts supported in the main frame, gear connections between the driven shafts and driving axle to rotate the said shafts in opposite directions with respect to each other, toothed grubbers fixed to the driven shafts and arranged diagonally with respect to each other, supporting means superposed upon said main frame, fenders depending from said supporting means and arranged on opposite sides of each grubber, and manually operable means to raise and lower the frame.

In testimony whereof, I affix my signature, in presence of two witnesses.

CHRISTIAN CANUTSON.

Witnesses:
CHRIS L. GREGERSEN,
TILLIE BELL.